US008608568B2

(12) United States Patent
Carpenter et al.

(10) Patent No.: US 8,608,568 B2
(45) Date of Patent: Dec. 17, 2013

(54) MONITORING WAGERING GAME MACHINES IN A NETWORK

(75) Inventors: Jerome Carpenter, Woodridge, IL (US); Mark C. Pace, Palatine, IL (US); Samuel D. Ralston, Chicago, IL (US); Jorge L. Shimabukuro, Las Vegas, NV (US); Matthew H. Phan, Las Vegas, NV (US); Jun Wang, Las Vegas, NV (US)

(73) Assignee: WMS Gaming Inc., Chicago, IL (US)

( * ) Notice: Subject to any disclaimer, the term of this patent is extended or adjusted under 35 U.S.C. 154(b) by 1316 days.

(21) Appl. No.: 12/096,001

(22) PCT Filed: Dec. 15, 2006

(86) PCT No.: PCT/US2006/047955
§ 371 (c)(1),
(2), (4) Date: Jun. 3, 2008

(87) PCT Pub. No.: WO2007/075441
PCT Pub. Date: Jul. 5, 2007

(65) Prior Publication Data

US 2008/0274795 A1 Nov. 6, 2008

Related U.S. Application Data

(60) Provisional application No. 60/743,042, filed on Dec. 15, 2005.

(51) Int. Cl.
*A63F 13/00* (2006.01)

(52) U.S. Cl.
USPC .......... 463/42; 463/29

(58) Field of Classification Search
USPC .......... 463/42, 24, 29
See application file for complete search history.

(56) References Cited

U.S. PATENT DOCUMENTS

| | | | | |
|---|---|---|---|---|
| 6,251,014 | B1 | 6/2001 | Stockdale et al. | |
| 7,201,660 | B2 | 4/2007 | Kiely et al. | |
| 2001/0036866 | A1* | 11/2001 | Stockdale et al. | 463/42 |
| 2001/0039212 | A1* | 11/2001 | Sawano et al. | 463/43 |
| 2004/0048669 | A1 | 3/2004 | Rowe | |
| 2004/0235562 | A1* | 11/2004 | Kiely et al. | 463/29 |

OTHER PUBLICATIONS

"International Search Report for Application No. PCT/US2006/47955, date mailed Nov. 19, 2007", 4 pgs.
"Written Opinion of the International Searching Authority for Application No. PCT/US2006/47955, date mailed Nov. 19, 2007", 6 pgs.

* cited by examiner

*Primary Examiner* — Arthur O. Hall
*Assistant Examiner* — Allen Chan
(74) *Attorney, Agent, or Firm* — Schwegman Lundberg & Woessner, P.A.

(57) ABSTRACT

Methods and apparatus for monitoring wagering game machines in a network are described herein. In one embodiment, a method for monitoring wagering game machines in a network includes receiving, in a wagering game machine, a wager associated with a wagering game. The method can also include receiving status information associated with a peripheral device or other component of the wagering game machine and transmitting diagnostic information indicating whether the peripheral device or other component needs service, wherein the diagnostic information is based at least in part on the status information.

22 Claims, 9 Drawing Sheets

MONITORING WAGERING GAME MACHINES IN A NETWORK

RELATED APPLICATIONS

This patent application is a U.S. National Stage Filing under 35 U.S.C. 371 from International Patent Application Serial No. PCT/US2006/047955, filed Dec. 15, 2006, and published on Jul. 5, 2007 as WO 2007/075441 A2 and republished as WO 2007/075441 A3, which claims the benefit of priority of U.S. Provisional Patent Application Ser. No. 60/743,042 filed on Dec. 15, 2005 and entitled "Monitoring Wagering Game Machines in a Network", the contents of which are incorporated herein by reference in their entirety.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever. Copyright 2005, WMS Gaming, Inc.

FIELD

This invention relates generally to the field of wagering game machines and more particularly to the field of wagering game machine maintenance and repair.

BACKGROUND

A wide variety of computerized wagering game machines are now available to casino operators and players. Computerized wagering game machines range from slot machines to games that are traditionally played live, such as poker, blackjack, roulette, etc. These wagering game machines provide many benefits to game owners and players, including increased reliability over mechanical machines, greater game variety, improved sound and animation, and lower overall management cost.

When technicians initially deploy wagering game machines for use in casinos, they typically manually wire the machines into wagering game networks and manually configure numerous settings. For example, the technicians may configure settings such as currency denominations for bill validators, screen resolution for video displays, volume for an audio devices, etc. Technicians often configure gaming machine settings by toggling DIP switches, moving expansion board jumpers, setting various dials and knobs, and paging through complicated set-up menus.

After deploying the wagering game machines into operation, technicians typically expend considerable efforts maintaining and repairing the machines. Technicians often utilize a variety of resources, such as service manuals and schematics, to facilitate the maintenance/repair process. However, despite these resources, even the most experienced technicians have difficulties maintaining and repairing wagering game machines in the field. Additionally, the maintenance/repair process can be complicated by a need for specialized tools and replacement parts.

BRIEF DESCRIPTION OF THE FIGURES

The present invention is illustrated by way of example and not limitation in the Figures of the accompanying drawings in which.

DESCRIPTION OF THE EMBODIMENTS

Systems and methods for monitoring wagering game machines in wagering game networks are described herein. This description of the embodiments is divided into five sections. The first section provides an introduction to embodiments of the invention. The second section describes example operating environment, while the third section describes example operations performed by some embodiments of the invention. The fourth section describes an example wagering game machine and the fifth section provides some general comments.

Introduction

Figure 1:
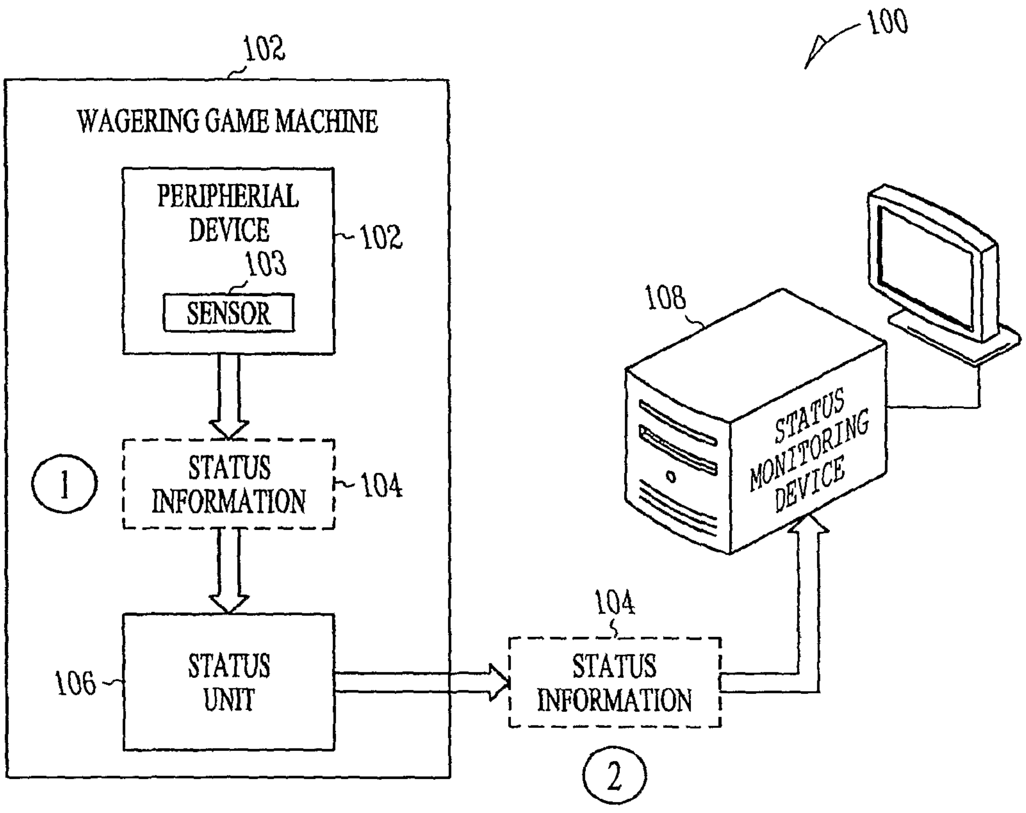
FIG. 1 is a dataflow diagram illustrating dataflow in a system for remotely monitoring wagering game machine components, according to example embodiments of the invention.

This section introduces embodiments of a system for monitoring wagering game machines in a wagering game network. Embodiments of the invention enable operators to remotely determine whether a wagering game machine's components need maintenance and/or repair. For example, embodiments of the system can remotely monitor a wagering game machine's ticket printer to determine whether it is low on toner or paper. If the system detects that the wagering game machine's printer is low on toner or paper, the system can electronically notify an attendant, who can refill the ticket printer's toner or paper. Thus, embodiments enable wagering game operators to detect and maintain/repair wagering game machine components before they become inoperable, avoiding potentially costly downtime. FIG. 1 describes an embodiment of the monitoring system in greater detail.

FIG. 1 is a dataflow diagram 100 illustrating dataflow in a system for remotely monitoring wagering game machine components, according to example embodiments of the invention. As shown in FIG. 1, the system includes a wagering game machine 101 including a status unit 106 and a peripheral device 102 (e.g., a ticket printer, bill validator, card reader, etc.). The peripheral device 102 can include a peripheral device sensor 103 that can sense a service status of the peripheral device 102. The peripheral device 102 can generate status information 104, which can include the service status sensed by peripheral device sensor 103 and any other information suitable for indicating the service status of the peripheral device 102. In addition to the service statuses described herein, the sensor 103 can also sense whether the peripheral device 102 is in a power-on mode or in a temporary power-off mode into which the peripheral device can switch to ensure a longer lifetime of the peripheral device 102 (e.g., hard drive being parked for a period of time to ensure longevity). The status unit 106 can communicate with a remotely located status monitoring device 108. The data flow occurs in two stages.

At stage 1, the status unit 106 receives status information from the peripheral device 102. The status information 104 can indicate that the peripheral device needs to be serviced (i.e., maintained or repaired).

At stage 2, the status unit 106 transmits the status information 104 to the status monitoring device 108. After the status monitoring device 108 receives the status information 104, it can notify an attendant that the peripheral device 102 needs maintenance or repairs.

These and other features will be described in more detail below. The next section describes example wagering game machines in more detail.

Example Operating Environment

Figure 2:
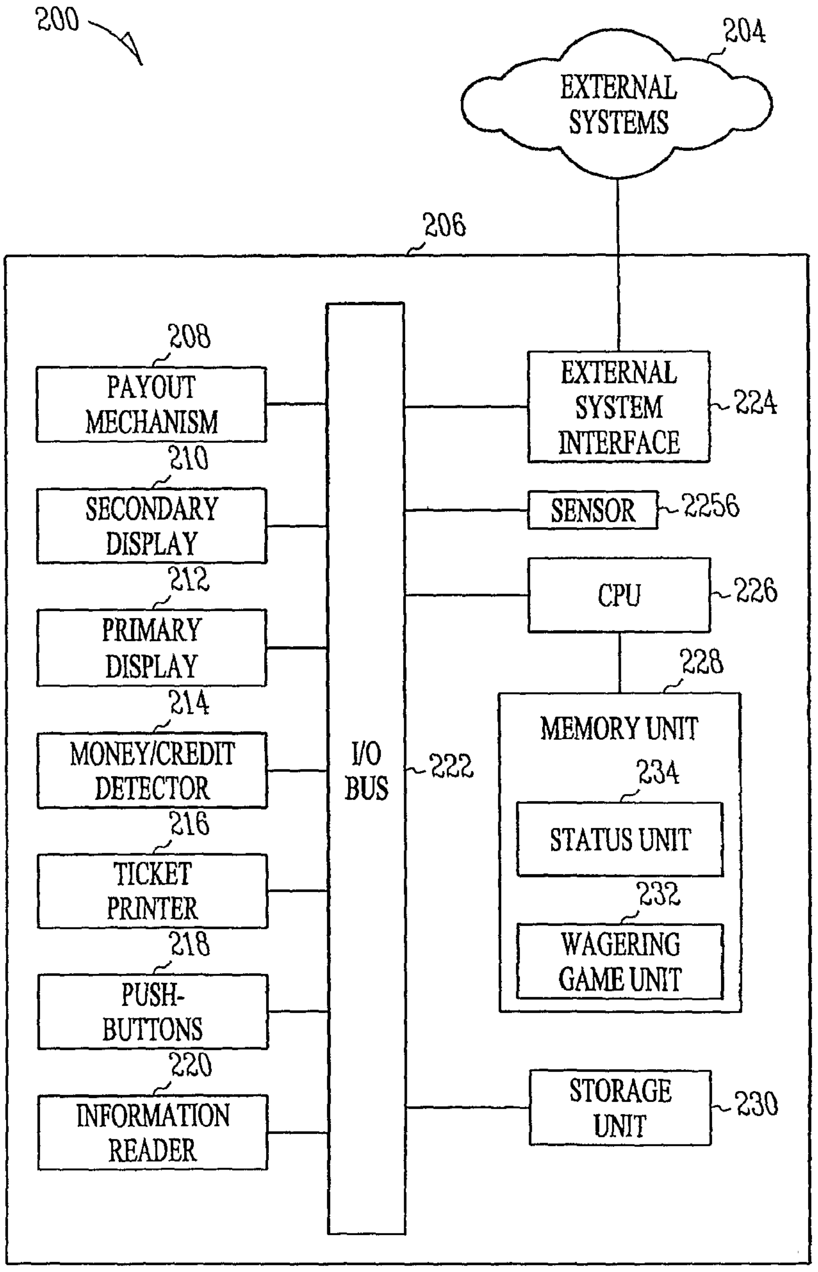
FIG. 2 is a block diagram illustrating a wagering game machine, according to example embodiments of the invention.

The section describes an example operating environment in which embodiments can be practiced. In particular, FIG. 2 presents an example wagering game machine capable of monitoring its peripheral devices, whereas FIG. 3 describes a wagering network in which a status information processor can receive and process status information about peripheral devices. The discussion continues with FIG. 2.

FIG. 2 is a block diagram 200 illustrating a wagering game machine, according to example embodiments of the invention. As shown in FIG. 2, the wagering game machine 206 includes a central processing unit (CPU) 226 connected to a memory unit 228, which includes a wagering game unit 232 and status unit 234. In one embodiment, the wagering game unit 232 can receive wagers while conducting any suitable casino-style wagering game, such as video poker, video blackjack, video slots, video lottery, etc. In one embodiment, the status unit 234 receives status information from one or more of the peripheral devices (e.g., the ticket printer 216, payout mechanism 208, etc.) and transmits the status information to a status monitoring device (see FIG. 3). Additionally, the status unit 234 can monitor hardware and software that are not part of the wagering game machine's peripheral devices. For example, the status unit 234 can monitor a hard disk drive (not shown), expansion card (not shown), network interface unit 224, CPU 226, memory unit 228, or other device by receiving status information from the wagering game machine's operating system (not shown) that manages the hardware or software resources. Furthermore, the operating system can provide status information of other components of the wagering game machine 206 or status information relating to the wagering game machine 206, based on readings obtained from one or more sensors 225. Sensors 225 can sense a variety of service conditions of the other components or the wagering game machine 206, including temperature of the CPU 226, motherboard (not shown) or graphical processing unit (GPU), voltage of power or battery (not shown), speed of fans (not shown), dropped packets via network interface unit 224, tilting (acceleration and shock detection) of the wagering game machine 206, tampering with the wagering game machine 206, exposure of the wagering game machine 206 to an electromagnetic field or electrostatic discharge, and the like.

The CPU 226 is also connected to an input/output (I/O) bus 222, which facilitates communication between the wagering game machine's components and peripheral devices. The I/O bus 222 is connected to a plurality of peripheral devices, including a payout mechanism 208, secondary display 210, primary display 212, money/credit detector 214, ticket printer 216, push-buttons 218, information reader 220, and storage unit 230. The I/O bus 222 is also connected to a network interface unit 224, which is connected to external systems 204 (e.g., a wagering game network).

In one embodiment, the wagering game machine 206 can include additional peripheral devices and/or more than one of each component shown in FIG. 2. For example, in one embodiment, the wagering game machine 206 can include multiple network interface units 224 and multiple CPUs 226. In one embodiment, any of the components can be integrated or subdivided. Additionally, in one embodiment, the components of the wagering game machine 206 can be interconnected according to any suitable interconnection architecture (e.g., directly connected, hypercube, etc.).

In one embodiment, any of the components of the wagering game machine 206 can include machine-readable media including instructions for performing operations described herein. Machine-readable media includes any mechanism that provides (i.e., stores and/or transmits) information in a form readable by a machine (e.g., a computer). For example, tangible machine-readable media includes read only memory (ROM), random access memory (RAM), magnetic disk storage media, optical storage media, flash memory devices, etc. Furthermore, components of the wagering game machine 206 can include any type of logic (e.g., digital logic) suitable for executing the operations described herein.

Figure 3:
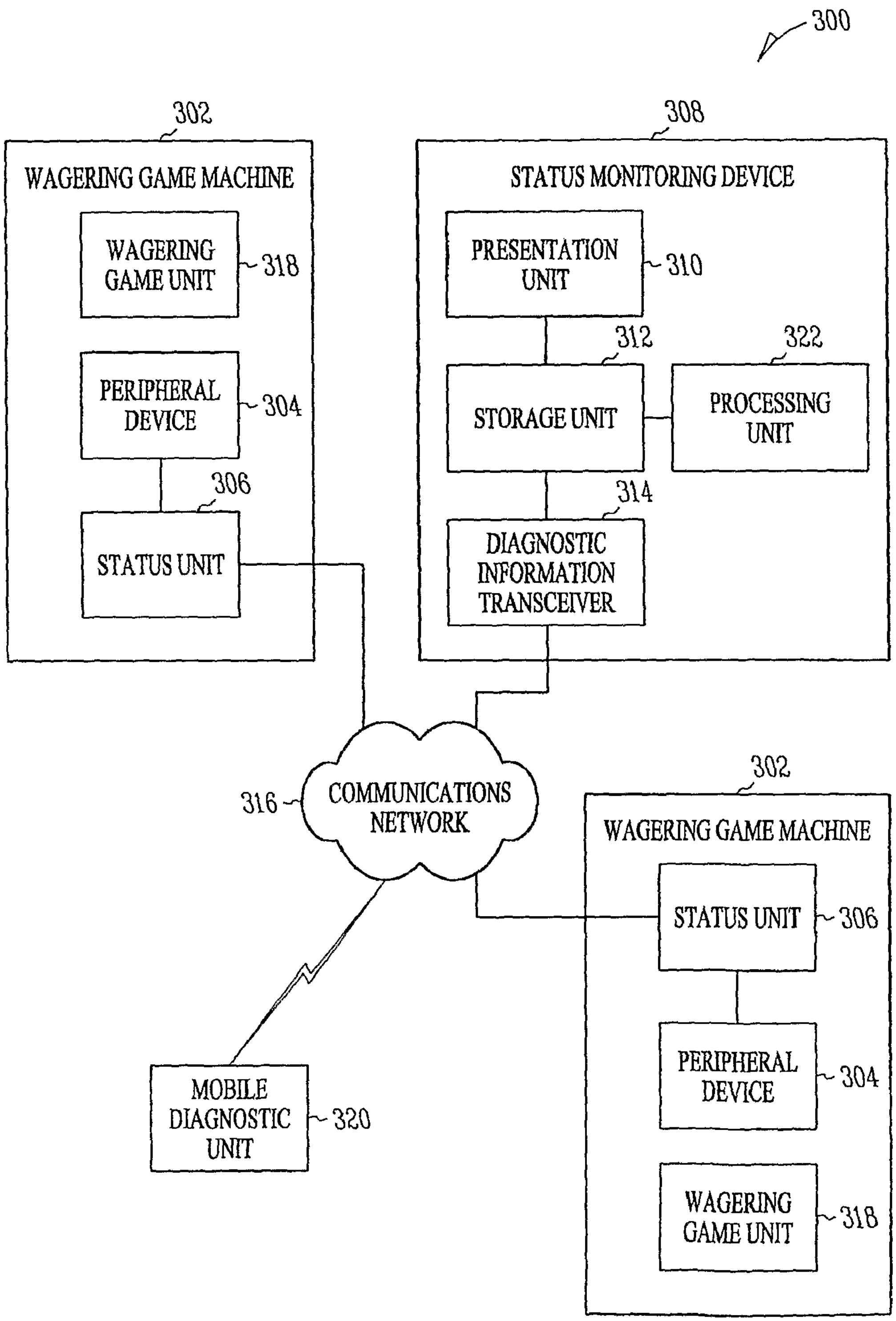
FIG. 3 is a block diagram illustrating a system for reporting and processing repair/maintenance information, according to example embodiments of the invention.

While the discussion of FIG. 2 describes various components of a wagering game machine, FIG. 3 describes additional details of a system for reporting and processing repair/maintenance information. This description continues with FIG. 3.

FIG. 3 is a block diagram illustrating a system 300 for reporting and processing status information, according to example embodiments of the invention. As shown in FIG. 3, the system 300 includes a plurality of wagering game machines 302, each of which includes a wagering game unit 318, peripheral device 304, and status unit 306. As noted above, the peripheral device can be a ticket printer, bill validator, etc. The status unit 306 can collect and transmit information indicating the repair/maintenance status of the peripheral device 304 or other component of the wagering game machine 302.

In FIG. 3, the wagering game machines 302 are connected to a status monitoring device 308 via a communications network 316. The wagering game machines 302 can be stationary units wired into the communications network 316 or they can be mobile units (e.g., handheld devices) capable of wirelessly connecting to the communications network 316.

The status monitoring device 308 includes a diagnostic information transceiver 314, which can transmit and receive diagnostic information relating to repair/maintenance status of the wagering game machines' peripheral devices and other components. The diagnostic information transceiver is connected to a storage unit 312, which is connected to a presentation unit 310 and processing unit 322. The storage unit 312 can store the diagnostic information for future retrieval and processing, whereas the processing unit 322 can calculate statistics and otherwise process the diagnostic information. The presentation unit 310 can present the diagnostic information through a graphical user interface and transmit electronic notifications about the repair/maintenance status of the wagering game machines 302. The processing unit 322 can also transmit via the diagnostic information transceiver 314 diagnostic information to a vendor database/knowledge base system for additional processing, service, repair information, or use the diagnostic information to generate and transmit an incident report/service request to the vendor system.

The system 300 also includes a mobile diagnostic unit 320. In one embodiment, the mobile diagnostic unit 320 is a handheld portable device capable of receiving and processing status information from the wagering game machines 302. In another embodiment, the mobile diagnostic unit 320 is part of a notebook computer or portable other computing device.

In one embodiment, any component of the system 300 can include any type of logic (e.g., digital logic, machine-readable media including software, etc.) suitable for executing the operations described herein. Operations performed by these and other embodiments are described in greater detail in the next section.

Operations

This section describes operations performed by embodiments of the invention. In the discussion below, the flow diagrams will be described with reference to the block diagrams presented above. In certain embodiments, the operations are performed by instructions residing on machine-readable media (e.g., software), while in other embodiments, the operations are performed by hardware and/or other logic (e.g., firmware).

Figure 4:
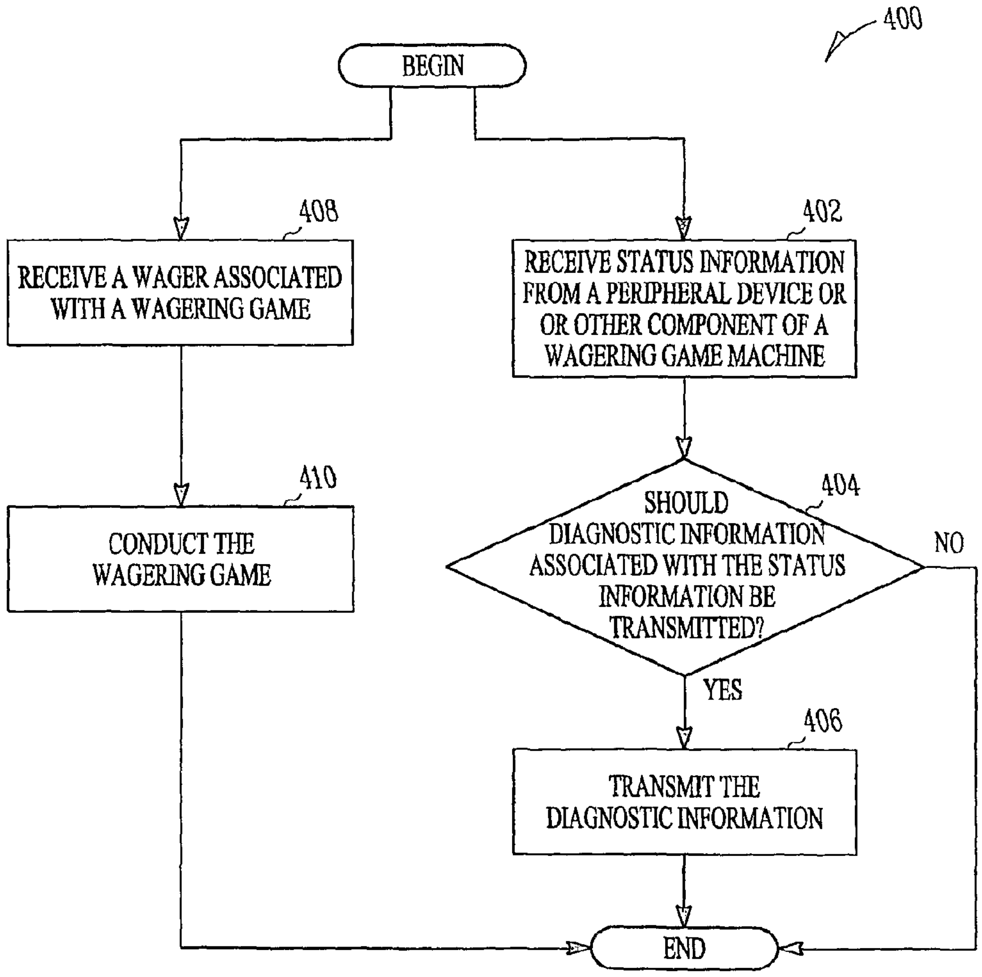
FIG. 4 is a flow diagram illustrating operations for receiving and transmitting information about peripheral devices or other components of a wagering game machine, according to example embodiments of the invention.
Figure 5:
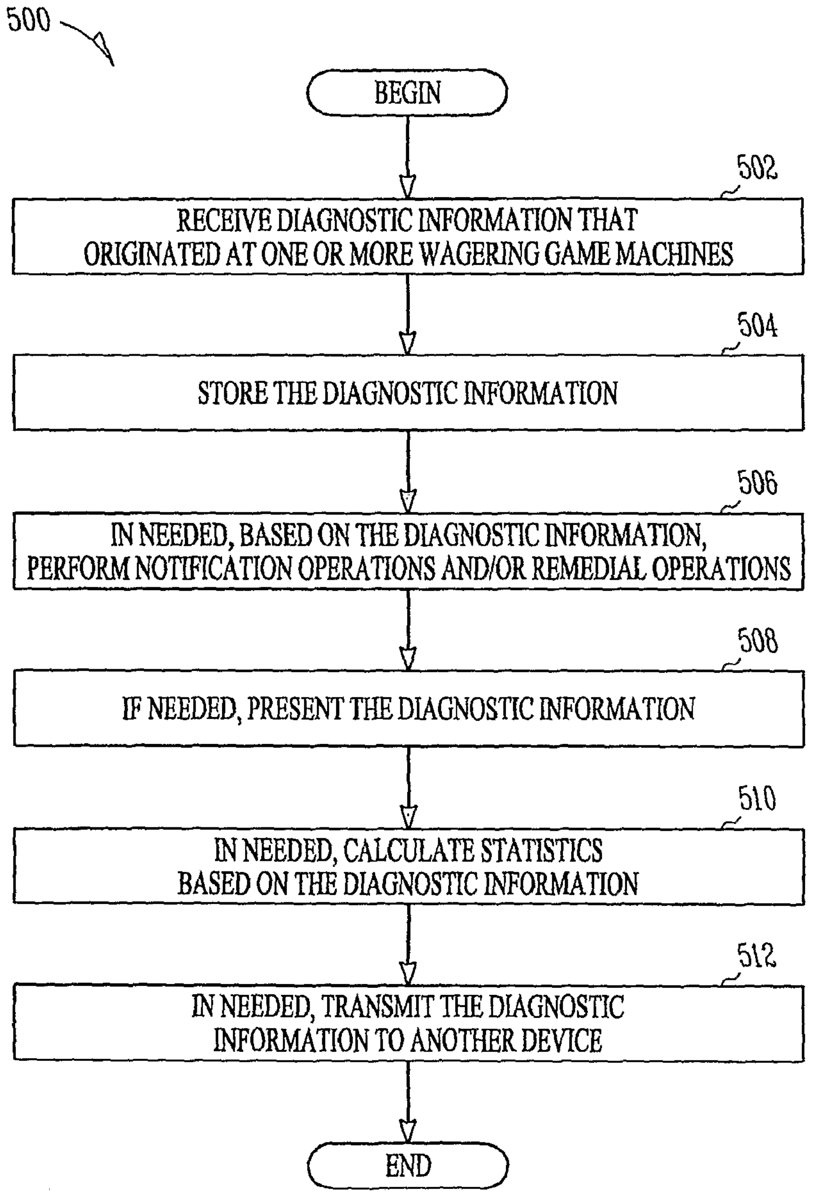
FIG. 5 is a flow diagram illustrating operations for processing information about wagering game machine peripheral devices or other components, according to example embodiments of the invention.
Figure 6:
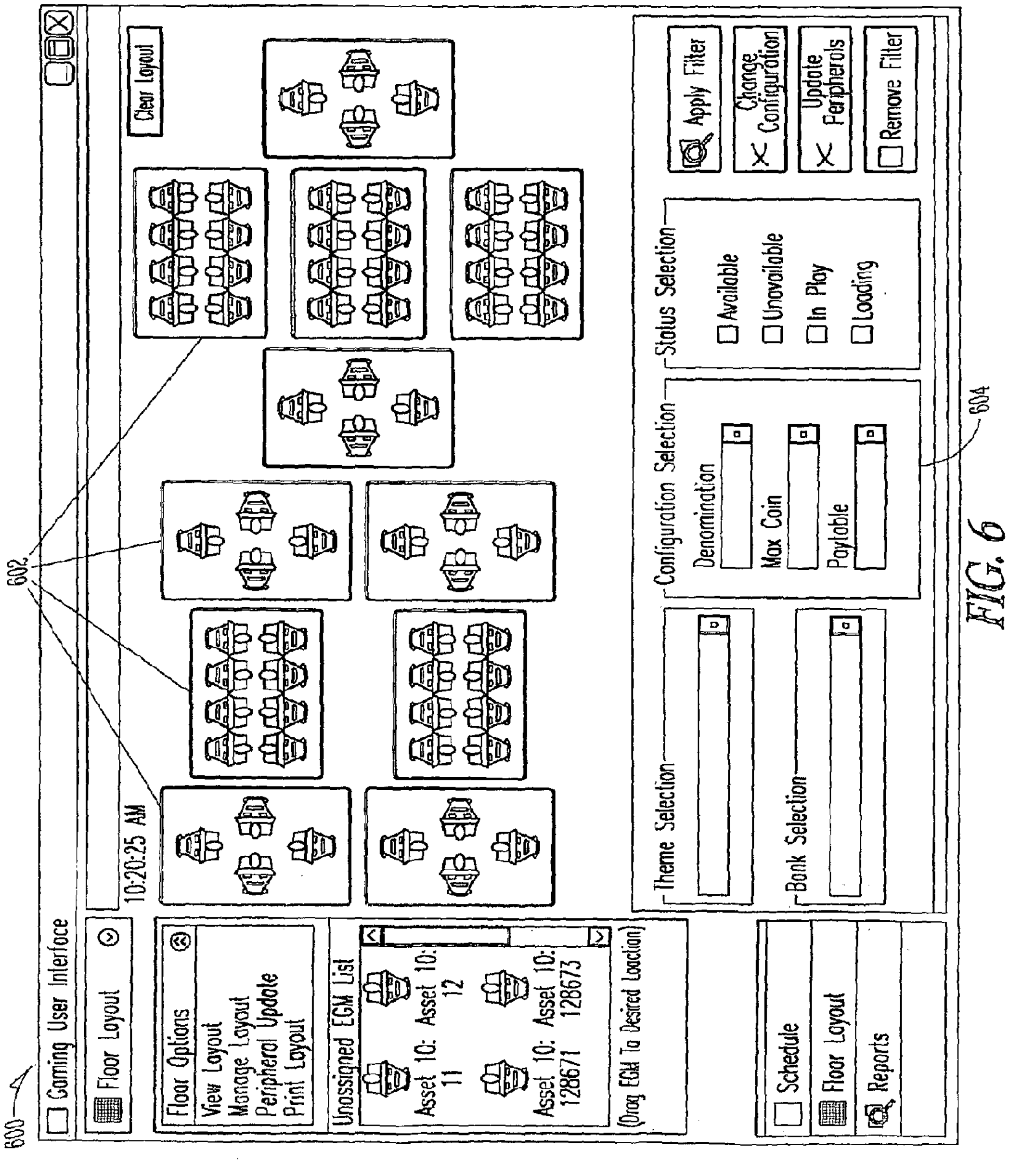
FIG. 6 is a diagrammatic illustration of a graphical user interface for presenting diagnostic information, according to example embodiments of the invention.

FIGS. 4-6 are discussed below. FIG. 4 describes operations for collecting and transmitting information about peripheral devices, while FIG. 5 describes operations for receiving and processing the information. This description will proceed with a discussion of FIG. 4.

FIG. 4 is a flow diagram 400 illustrating operations for receiving and transmitting information about peripheral devices or other components of a wagering game machine, according to example embodiments of the invention. The flow diagram 400 commences in parallel at blocks 402 and 408.

At block 402, status information is received for a peripheral device or other component of the wagering game machine. For example, the status unit 306 receives status information from the peripheral device 304 or other component of the wagering game machine. In one embodiment, the peripheral device 304 or other component pushes the status information to the status unit 306. Alternatively, the status unit 306 polls the peripheral device 304 or other component for the status information. The pushing and/or polling can occur periodically, randomly, or in response to an event (e.g., a request from the status monitoring device 308). In yet another embodiment, the status unit 306 polls the wagering game machine's operating system (not shown) for status information about the peripheral device 304. As noted above, the status unit 306 can receive status information about other components, such as memory, hard disk drives, expansion cards, etc.

The status information can include any information suitable for indicating the peripheral device's or component's service status. That is, the status information can include any information that indicates whether maintenance, repairs, or other services are needed immediately or sometime in the future. In one embodiment, the status information can include sensor readings, error codes, a memory dump, or other information for the peripheral device or other component, or the wagering game machine's operating system. The status information may indicate: a printer is running out of paper, a coin hopper is filling up with coins, a bill validator is rejecting a high number of bills, a light bulb is burned out, a print head is overheating, a switch is faulty, cooling fans are running for longer than usual, temperature of the CPU, motherboard or graphical process unit is higher than normal, network interface unit is dropping an increasing number of packets, the wagering game machine has been tilted, etc.

The flow continues at block 404.

At block 404, a determination is made about whether to transmit diagnostic information associated with the status information. For example, the status unit 306 determines whether to transmit the status information and/or other diagnostic information to the status monitoring device 308. In one embodiment, the status unit 306 does not transmit diagnostic information every time it receives status information. Instead, the status unit 306 collects status information and begins creating diagnostic information based on the status information. For example, the status unit 306 may collect a series of temperature readings (or other information) for a peripheral device or other component. Based on the temperature readings (or other information), the status unit 306 creates diagnostic information indicating whether the peripheral device or other component needs service. After the diagnostic information satisfies certain rules, meets certain thresholds, or otherwise satisfies given conditions, the status unit 306 will transmit the diagnostic information to the status monitoring device 308 or the mobile diagnostic unit 320.

In another embodiment, the status unit 306 simply forwards the status information after receiving it from the peripheral device 304. Thus, the diagnostic information is made-up of the status information. In yet another embodiment, the status unit 306 periodically transmits diagnostic information or it transmits diagnostic information in response to a request from the status monitor device 308.

The flow continues at block 406.

At block 406, the diagnostic information is transmitted. For example, the status unit 306 transmits the diagnostic information to the status monitoring device 308. Alternatively, the status unit 306 can transmit the diagnostic information to the mobile diagnostic unit 320. The status unit 306 can use any suitable transmission technology for transmitting the diagnostic information to the monitoring device 308. For example, the status unit can use 802.11g, cellular technology, Ethernet, etc. From block 406, the flow ends.

As shown in FIG. 4, the operations at blocks 408 and 410 occur in parallel with the operations at block 402, 404, and 406. At block 408, a wager is received, where the wager is associated with a wagering game. For example, the wagering game unit 318 receives a wager associated with a wagering game. The flow continues at block 410.

At block 410, the wagering game is conducted. For example, the wagering game unit 318 determines and presents a result of the wagering game. In one embodiment, the result of the wagering game is determined by another machine, such as a remote wagering game server. From block 410, the flow ends.

Even though the discussion of FIG. 4 describes the operations of the flow diagram 400 as executing in parallel, the operations at blocks 408 and 410 can occur before or after the operations at block 402, 404, and 406 or in any other suitable order.

This description continues with a discussion of FIG. 5.

FIG. 5 is a flow diagram 500 illustrating operations for processing information about wagering game machine peripheral devices, according to example embodiments of the invention. The flow diagram 500 begins at block 502.

At block 502, diagnostic information is received, where the diagnostic information originates at one or more wagering game machines. For example, the status monitoring device's diagnostic information transceiver 314 receives diagnostic information from a wagering game machine's status unit 306. The flow continues at block 504.

At block 504, the diagnostic information is stored. For example, the diagnostic information transceiver 314 stores the diagnostic information in the storage unit 312. The flow continues at block 506.

At block 506, based on the diagnostic information, notification operations are performed, if needed. For example, the presentation unit 310 performs notification operations, if needed. In one embodiment, the notification operations include sending e-mails notifying attendants about maintenance or repairs needed for particular wagering game machines. In another embodiment, the notification operations include sending text messages using the short messaging service protocol or any other suitable messaging protocol. In yet another embodiment, the mobile diagnostic unit 320 can remotely perform any suitable remedial operations, such as rebooting a wagering game machine 302, revising a wagering game machine's configuration information, switching-off malfunctioning peripheral devices or other components, etc. The flow continues at block 508.

At block 508, the diagnostic information is presented, if needed. For example, if needed, the presentation unit 310 presents the diagnostic information through a graphical user interface (GUI). FIG. 6 shows one such GUI.

FIG. 6 is a diagrammatic illustration of a graphical user interface (GUI) 600 for presenting diagnostic information, according to example embodiments of the invention. The GUI 600 can present diagnostic information associated with the wagering game machines 302 in a graphical format. As shown in FIG. 6, the graphical user interface 600 includes a number of bank windows 602, which depict different banks of wagering game machines laid-out on a casino floor. A bank window 602 can present color-coded information for each wagering game machine appearing therein. For example, a machine may be colored red when needing immediate service, yellow when needing maintenance soon, and green when needing nothing. The GUI 600 can also use color and flash codes for distinguishing between types of services. Additionally, the GUI 600 can be used in concert with audible indicators.

The GUI 600 also includes a control window 604 in which an attendant can enter service commands for remotely servicing the wagering game machines 302.

Referring back to FIG. 5, the flow continues at block 510.

At block 510, if needed, statistics are calculated based on the diagnostic information. For example, the processing unit 322 calculates statistics based on the diagnostic information. The statistics can track the number and type of repairs each peripheral device or other component has needed or the frequency with which services are needed. Additionally, the processing unit 322 can use the diagnostic information for deriving performance statistics, such as peripheral device or other component utilization, memory utilization, CPU utilization, printed pages per day, bills received per day, etc. Furthermore, the processing unit 322 can also transmit the diagnostic information to a vendor database/knowledge base system for additional processing, service or repair information, or use the diagnostic information to generate and transmit an incident report/service request to the vendor system The flow continues at block 512.

At block 512, if needed, the diagnostic information is transmitted to another device. For example, if needed, the diagnostic information transceiver 314 transmits diagnostic information to the mobile diagnostic unit 320 (see discussion of FIG. 7). In one embodiment, the diagnostic transceiver 314 can transmit the diagnostic information and statistics to the wagering game machines' manufacturers and/or manufacturers of the peripheral devices, so they can better understand their wagering game machines or peripherals and the environments in which they are operating, as well as providing additional processing, service or repair information.

This description continues with a discussion of operations performed by embodiments of the mobile diagnostic unit 320.

Figure 7:
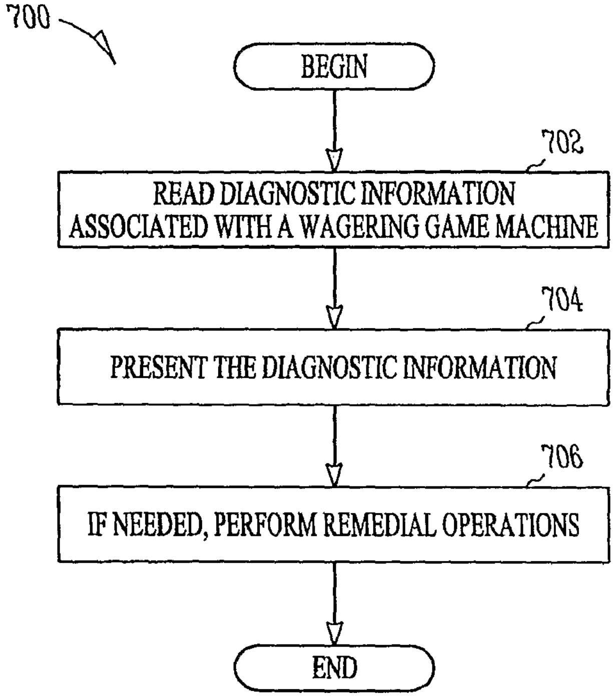
FIG. 7 is a flow diagram illustrating operations for receiving and presenting diagnostic information in mobile device, according to example embodiments of the invention.

FIG. 7 is a flow diagram 700 illustrating operations for receiving and presenting diagnostic information in a mobile device, according to example embodiments of the invention. The flow diagram 700 begins at block 702.

At block 702, diagnostic information associated with a wagering game machine is received. For example, the mobile diagnostic unit 320 receives diagnostic information from the status monitoring device 308. Alternatively, the mobile diagnostic unit 320 can receive diagnostic information from a gaming machine 302. From block 702, the flow continues at block 704.

At block 704, the diagnostic information is presented. For example, the mobile diagnostic unit 320 presents the diagnostic information in a graphical user interface, such as the GUI 600 of FIG. 6.

In one embodiment, mobile diagnostic unit 320 is capable of determining its physical proximity to particular wagering game machines 302. For example, the mobile diagnostic unit 320 can include global positioning system logic, radiofrequency logic, 802.11 logic, or other logic suitable for determining physical proximity to the gaming machines 320. As a technician carries the mobile diagnostic unit 320 within proximity of a given wagering game machine 302, the mobile diagnostic unit 320 can present diagnostic information associated with that wagering gaming machine, eliminating the technician's need to search for diagnostic information relevant the given machine.

The flow continues at block 706.

At block 706, if needed, remedial operations are performed, where the remedial operations are based at least in part on the diagnostic information. For example, the mobile diagnostic unit 320 performs remedial operations based on the diagnostic information. In one embodiment, the mobile diagnostic unit 320 can perform any suitable remedial operations, such as rebooting a wagering game machine 302, revising a wagering game machine's configuration information, switching-off malfunctioning peripheral devices, etc. From block 706, the flow ends.

This section described operations performed by embodiments of the invention, whereas the next section describes additional embodiments of the invention.

Example Wagering Game Networks and Wagering Game Machines

This section describes example wagering game machines and wagering game networks with which embodiments of the invention can be practiced.

Example Wagering Game Network

Figure 8:
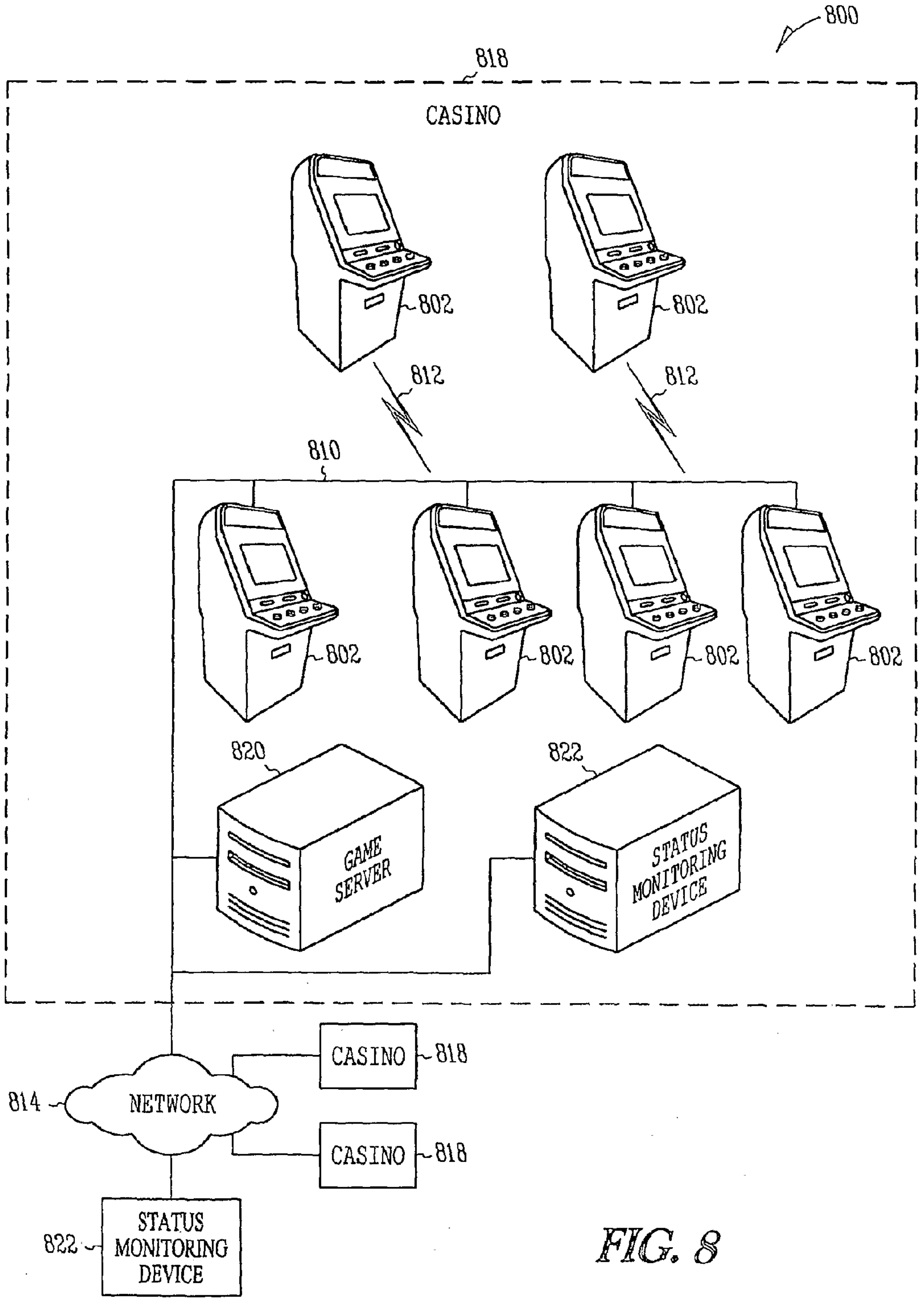
FIG. 8 is a block diagram illustrating a wagering game network, according to example embodiments of the invention.

FIG. 8 is a block diagram illustrating a wagering game network 800, according to example embodiments of the invention. As shown in FIG. 8, the wagering game network 800 includes a plurality of casinos 818 connected to a communications network 814.

Each of the plurality of casinos 818 can include local area networks, which include a plurality of wagering game machines 802 connected to a game server 820. In one embodiment, the gaming server 820 provides wagering game content and/or determines outcomes of wagering games presented by the wagering game machines 802. In one embodiment, the wagering game machines 802, status monitoring devices 822, and/or the game servers 820 include hardware, software, and/or other logic for monitoring wagering game machines, as described herein. Status monitoring devices 822 can be located inside or outside the casinos 818, being connected therewith via communications network 814.

The components of each casino 818 can communicate over wired 810 and/or wireless connections 812. Furthermore, they can employ any suitable connection technology, such as Bluetooth, 802.11, SONET/SDH, Ethernet, public switched telephone networks, etc.

Example Wagering Game Machine

Figure 9:
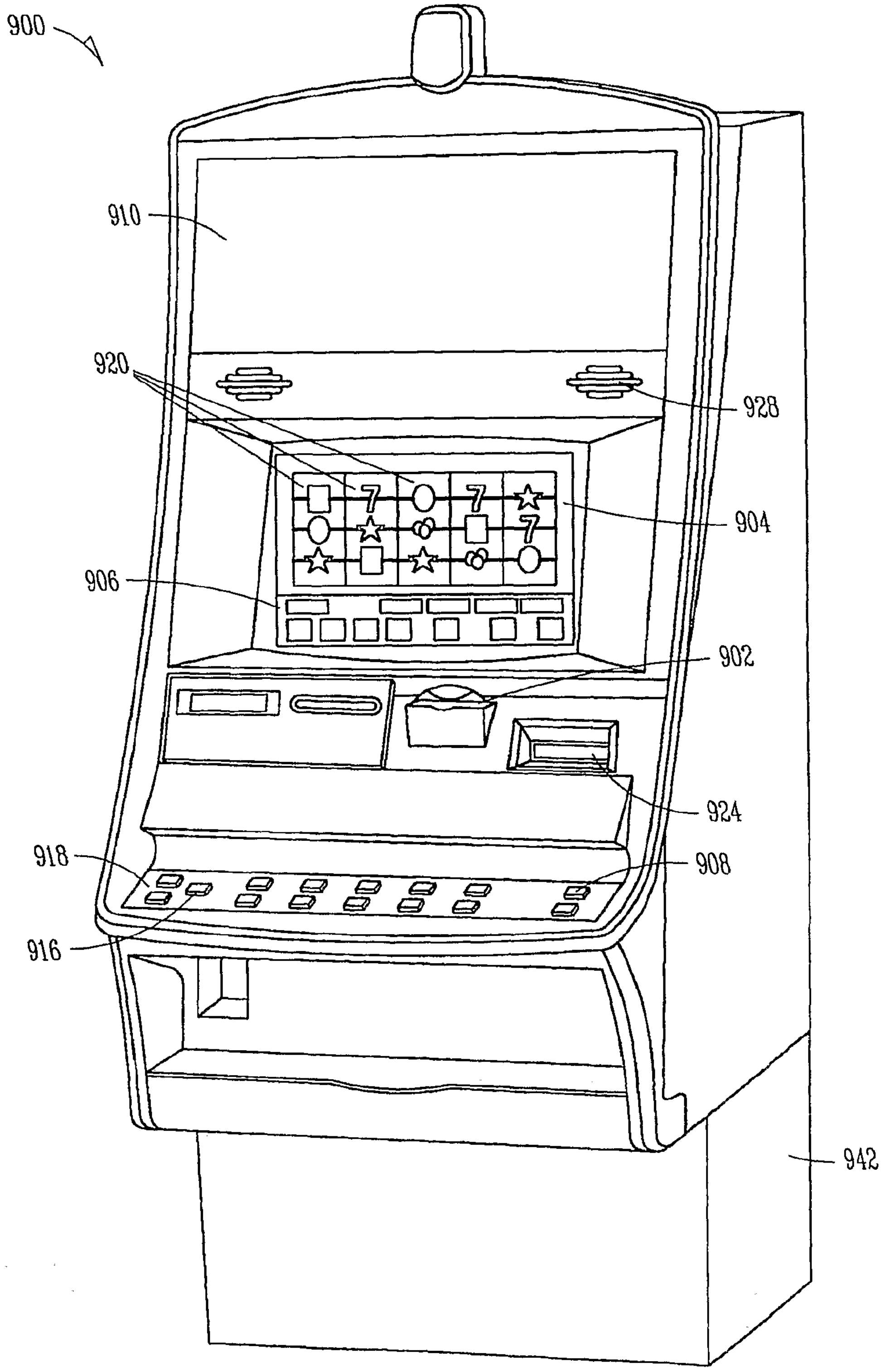
FIG. 9 is a block diagram illustrating a wagering game network, according to example embodiments of the invention.

FIG. 9 is a perspective view of a wagering game machine 900, according to example embodiments of the invention. As shown in FIG. 9, the wagering game machine 900 can be a computerized slot machine having the controls, displays, and features of a conventional slot machine.

The wagering game machine 900 can be mounted on a stand 942 or it can be constructed as a pub-style tabletop game (not shown). Additionally, the wagering game machine 900 can be a tablet or a portable unit. As a result, the wagering game machine 900 can be operated while players are standing or seated. Furthermore, the wagering game machine 900 can be constructed with varying cabinet and display designs. The wagering game machine 900 can incorporate any primary game such as slots, poker, or keno, and additional bonus round games. The symbols and indicia used on and in the wagering game machine 900 can take mechanical, electrical, or video form.

As illustrated in FIG. 9, the wagering game machine 900 includes a coin slot 902 and bill acceptor 924. Players can place coins in the coin slot 902 and paper money or ticket vouchers in the bill acceptor 924. Other devices can be used for accepting payment. For example, credit/debit card readers/validators can be used for accepting payment. Additionally, the wagering game machine 900 can perform electronic funds transfers and financial transfers to procure monies from financial accounts. When a player inserts money in the wagering game machine 900, a number of credits corresponding to the amount deposited are shown in a credit display 906. After depositing the appropriate amount of money, a player can begin playing the game by pushing play button 908. The play button 908 can be any play activator used for starting a wagering game or sequence of events in the wagering game machine 900.

As shown in FIG. 9, the wagering game machine 900 also includes a bet display 912 and one or more "bet" buttons on the panel 916. The player can place a bet by pushing one or more of the bet buttons on the panel 916. The player can increase the bet by one or more credits each time the player pushes a bet button. When the player pushes a "bet one" button 916, the number of credits shown in the credit display 906 decreases by one credit, while the number of credits shown in the bet display 912 increases by one credit.

A player may end the gaming session or "cash-out" by pressing a cash-out button 918. When a player cashes-out, the wagering game machine 900 dispenses a voucher or currency corresponding to the number of remaining credits. The wagering game machine 900 may employ other payout mechanisms such as credit slips (which are redeemable by a cashier) or electronically recordable cards (which track player credits), or electronic funds transfer.

The wagering game machine also includes a primary display unit 904 and a secondary display unit 910 (also known as a "top box"). The wagering game machine may also include an auxiliary video display 940. In one embodiment, the primary display unit 904 displays a plurality of video reels 920. According to embodiments of the invention, the display units 904 and 910 can include any visual representation or exhibition, including moving physical objects (e.g., mechanical reels and wheels), dynamic lighting, and video images. In one embodiment, each reel 920 includes a plurality of symbols such as bells, hearts, fruits, numbers, letters, bars or other images, which correspond to a theme associated with the wagering game machine 900. Additionally, the wagering game machine 900 also includes an audio presentation unit 928. The audio presentation unit 928 can include audio speakers or other suitable sound projection devices.

In one embodiment, the wagering game machine 900 includes hardware, software, or other logic for monitoring its components and peripheral devices, as described herein.

General

In this description, numerous specific details are set forth. However, it is understood that embodiments of the invention may be practiced without these specific details. In other instances, well-known circuits, structures and techniques have not been shown in detail in order not to obscure the understanding of this description. Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein. Each claim, as may be amended, constitutes an embodiment of the invention, incorporated by reference into the detailed description.

Herein, block diagrams illustrate example embodiments of the invention. Also herein, flow diagrams illustrate operations of the example embodiments of the invention. The operations of the flow diagrams are described with reference to the example embodiments shown in the block diagrams. However, it should be understood that the operations of the flow diagrams could be performed by embodiments of the invention other than those discussed with reference to the block diagrams, and embodiments discussed with references to the block diagrams could perform operations different than those discussed with reference to the flow diagrams. Additionally, some embodiments may not perform all the operations shown in a flow diagram. Moreover, although the flow diagrams depict serial operations, certain embodiments could perform certain of those operations in parallel.

The invention claimed is:

1. A non-transitory machine-readable medium including instructions which when executed by a machine cause the machine to perform operations comprising:

receiving a wager associated with a wagering game;

collecting status information about a plurality of the machine's peripheral devices or other components over a period of time;

using the status information to derive diagnostic information, the diagnostic information representing a trend in the status information over the period of time;

determining whether the diagnostic information should be transmitted based on whether the diagnostic information satisfies a condition;

transmitting the diagnostic information to a remote device for evaluation after determining that the diagnostic information should be transmitted;

receiving a command to execute a remedial operation based on the evaluation; and executing the remedial operation.

2. The machine-readable medium of claim 1, wherein the determining whether the diagnostic information should be transmitted comprises:

evaluating whether an event has occurred, wherein the event is related to the collected status information and wherein the event is selected from the group consisting of:

whether a threshold has been met, whether a certain time has elapsed, or whether a rule has been satisfied; and determining that the diagnostic information should be transmitted when the event has occurred.

3. The machine-readable medium of claim 1, wherein the transmitting of the diagnostic information informs an operator about the maintenance services needed by the ones of the plurality of peripheral devices or other components.

4. The machine-readable medium of claim 1, wherein the collecting of service information includes periodically polling the plurality of peripheral devices, other components, or one or more sensors for the service information about the peripheral devices or other components.

5. The machine-readable medium of claim 1, wherein the transmitting of the diagnostic information is performed in response to a request from the remote device.

6. The machine-readable medium of claim 1 further comprising:

compiling statistics about the maintenance services needed by the plurality of peripheral devices or other components, the statistics based at least in part on the status information.

7. A method comprising:

receiving, in a wagering game machine, a wager associated with a wagering game;

receiving over a period of time status information associated with a peripheral device or other component of the wagering game machine;

using the status information to derive diagnostic information via at least one processor, the diagnostic information representing a trend in the status information over the period of time;

determining whether diagnostic information should be transmitted based on whether the diagnostic information satisfies a condition;

transmitting diagnostic information to a remote device after determining that the diagnostic information should be transmitted;

receiving a command to execute a remedial operation from the remote device; and executing the remedial operation.

8. The method of claim 7, wherein the diagnostic information is destined for a remote status monitoring device which receives diagnostic information from a plurality of wagering game machines.

9. The method of claim 7, further comprising using the diagnostic information to facilitate preventative maintenance.

10. The method of claim 7, wherein the diagnostic information includes the status information.

11. The method of claim 7, wherein the determining is based at least in part on whether a threshold has been met, whether a certain time has elapsed, or whether a rule has been satisfied.

12. The method of claim 7, wherein the status information associated with the peripheral device or other component is received as a result of scheduled reporting, occurrence of an event, or a request from a remote device.

13. The method of claim 7, further comprising transmitting the diagnostic information to at least one of: a wagering game machine manufacturer or a wagering game peripheral manufacturer.

14. An apparatus comprising:

a wagering game machine including, a wagering game unit to receive a wager associated with a wagering game;

a device to perform an operation; and a status unit operable to:

receive status information from the device over a period of time;

derive diagnostic information from the status information, where the diagnostic information represents a trend in the status information over the period of time;

determine whether diagnostic information should be transmitted based on whether the diagnostic information satisfies a condition; and transmit the diagnostic information to a remote status monitoring device for evaluation after determining that the diagnostic information should be transmitted, wherein the wagering game machine is to receive a command to execute a remedial operation based on the evaluation and execute the remedial operation.

15. The apparatus of claim 14, wherein the device is one of a peripheral device and another component of the wagering game machine.

16. The apparatus of claim 14, wherein the remote status monitoring device is further operable to, based on the diagnostic information, notify an attendant that the device needs service.

17. The apparatus of claim 14, wherein the remote status monitoring device is further operable to transmit the diagnostic information to a portable diagnostic tool.

18. The apparatus of claim 14, wherein the status unit is further operable to transmit the diagnostic information to a portable diagnostic tool.

19. The apparatus of claim 14, wherein the remote status monitoring device is further operable to calculate statistics based on the diagnostic information.

20. The apparatus of claim 14, wherein the remote status monitoring device uses the diagnostic information to facilitate preventative maintenance.

21. The tangible machine-readable medium of claim 1, wherein the remedial operation comprises rebooting the machine.

22. The tangible machine-readable medium of claim 1, wherein the remedial operation comprises disabling the peripheral device that indicates maintenance services needed.

* * * * *

UNITED STATES PATENT AND TRADEMARK OFFICE

CERTIFICATE OF CORRECTION

PATENT NO. : 8,608,568 B2
APPLICATION NO. : 12/096001
DATED : December 17, 2013
INVENTOR(S) : Carpenter et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1496 days.

Signed and Sealed this
Twenty-second Day of September, 2015

Michelle K. Lee

Michelle K. Lee
*Director of the United States Patent and Trademark Office*